(12) United States Patent
Joyner et al.

(10) Patent No.: US 6,328,553 B1
(45) Date of Patent: Dec. 11, 2001

(54) RAM SUPPORT SKATE FOR AN INJECTION MOLDING MACHINE

(75) Inventors: Van K. Joyner, West Chester; Ronald A. Hertzer; Frederick F. Van Keuren, III, both of Cincinnati, all of OH (US)

(73) Assignee: Uniloy Milacron USA Inc., Manchester, MI (US)

( * ) Notice: Subject to any disclaimer, the term of this patent is extended or adjusted under 35 U.S.C. 154(b) by 0 days.

(21) Appl. No.: 09/402,414

(22) PCT Filed: May 13, 1998

(86) PCT No.: PCT/US98/09736

§ 371 Date: Oct. 4, 1999

§ 102(e) Date: Oct. 4, 1999

(87) PCT Pub. No.: WO98/51469

PCT Pub. Date: Nov. 19, 1998

Related U.S. Application Data

(60) Provisional application No. 60/046,627, filed on May 16, 1997.

(51) Int. Cl.[7] .................................................. B29C 45/64
(52) U.S. Cl. ......................... 425/190; 29/281.5; 29/428; 264/39; 425/595
(58) Field of Search .................................. 425/190, 595, 425/451.9; 29/281.5, 428; 264/39, 328.1

(56) References Cited

U.S. PATENT DOCUMENTS

| | | | |
|---|---|---|---|
| Re. 29,294 | 7/1977 | Pierre | 425/590 |
| 3,418,692 | 12/1968 | Valyi | 425/451.2 |
| 4,315,728 | 2/1982 | Hehl | 425/589 |
| 5,338,171 | * 8/1994 | Hayakawa et al. | 425/595 |
| 5,454,709 | 10/1995 | Leonhartsberger et al. | 425/589 |
| 5,547,367 | 8/1996 | Stein | 425/589 |

* cited by examiner

Primary Examiner—James P. Mackey
(74) Attorney, Agent, or Firm—Stephen H. Friskney

(57) ABSTRACT

A self-compensating support skate (46) for an annular hydraulic ram (15) mounted in the front stationary platen (10) of a "two-platen" injection molding machine (1) is disclosed. The hydraulic ram (15) fits into a central bore (22) in the stationary platen (10) and connects directly to a relatively thin die platen (11) that provides a mold mounting surface. The purpose of the skate (46) is to prevent movement (tilting) of the die platen (11) and the resulting misalignment with the movable platen (20) when the mold (30) is attached. The skate (46) is adjusted during assembly to compensate for the tolerance stack-up in the ram assembly. The "zero" clearance is maintained by disc springs (56) within the skate (46) that compensate for the expansions and contractions of the large diameter parts due to temperature variations. The die platen (11) is held in the aligned position by contact with the lower tie rods (7).

22 Claims, 7 Drawing Sheets

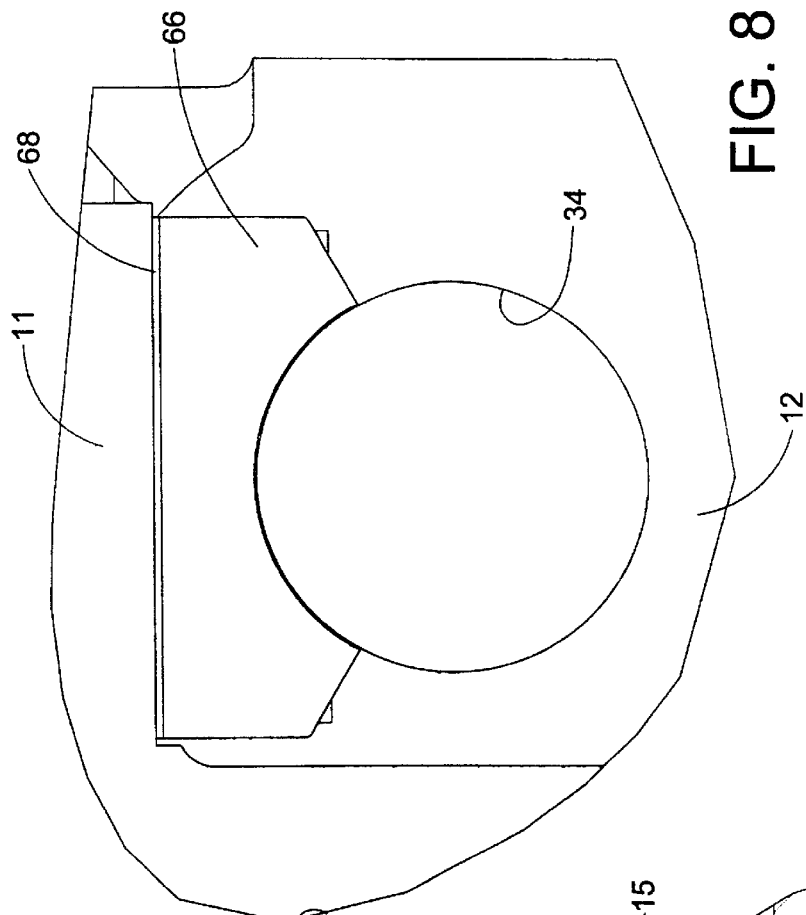
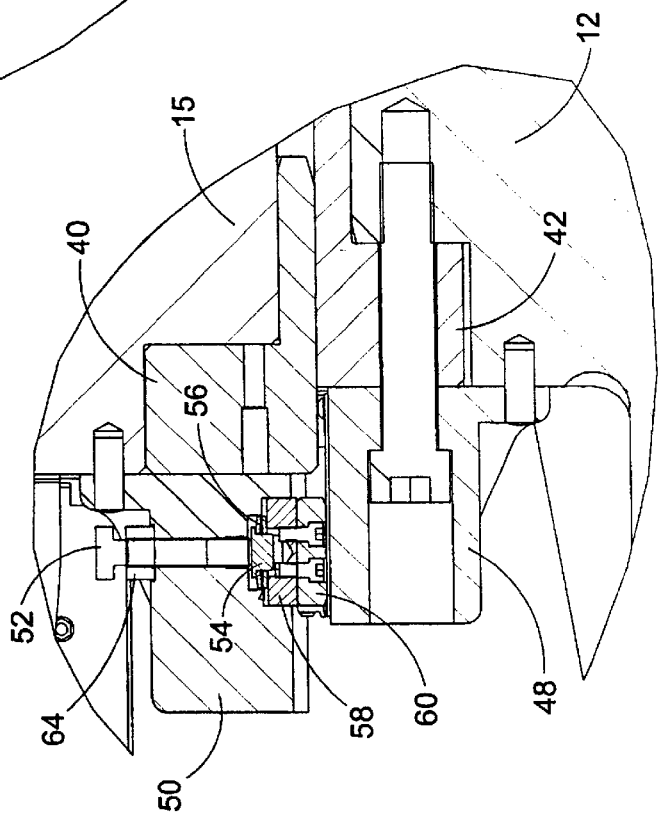

RAM SUPPORT SKATE FOR AN INJECTION MOLDING MACHINE

This application claims priority to Provisional Application Serial No. 60/046,627, filed May 16, 1997.

BACKGROUND OF THE INVENTION

1. Field of the Invention

The present invention relates to a mold clamping system for an injection molding machine and, more particularly to apparatus to support a short-stroke hydraulic ram in a two-platen injection molding machine.

2. Description of the Related Art

The clamping system of a typical injection molding machine generally comprises two rectangular stationary platens; a front platen adjacent the machine's injection unit, and a rear platen, with tie rods connecting the four corners of the two platens. A movable platen is located between the stationary platens and is supported by the tie rods in a way that allows for translational movement between the two stationary platens. A mold constructed in two "halves" is mounted so that one half is attached to the front stationary platen and the other half attached to the movable platen. The force for the clamping system is usually provided by a hydraulic cylinder that acts directly or via a toggle mechanism to open and close the mold halves by applying the appropriate force to the movable platen. With the mold held closed by the clamping system, plastic melt is injected into the cavity formed by the mold halves, forming a molded product.

One of the drawbacks of the conventional, three platen injection molding machines is that the overall length of the machine is relatively long, meaning that the machine occupies a significant amount of valuable space on the manufacturing floor.

Accordingly, the prior art has proposed various "two-platen" constructions for injection molding machines that have only one stationary platen. More specifically, prior art two platen clamping systems generally include a front (stationary) platen, a movable platen, four tie rods fixedly connected to one of the platens, releasable nuts attached to the other platen to engage the tie rods, means for traversing the movable platen, and one or more clamping cylinders to hold the mold closed. In operation, the movable platen is traversed into position to close the mold; the nuts are then closed on the tie rods to provide a rigid link between the two platens; and clamp tonnage is applied by the clamp cylinder in preparation for injection of the plastic melt.

While two-platen machines have the advantage of significantly shorter overall length, their configuration also presents potential problems. For example, since the two-platen design is primarily used for larger machines, the associated molds tend to also be very large and heavy. The weight of the mold must be supported by the platens in such a way that the platen surfaces remain parallel when the mold is open, so that it will close smoothly and properly form the mold cavity. However, the eccentric weight makes this difficult, particularly since the tie rods are fixedly supported at only one end when the movable platen is in motion.

In addition, most prior art two-platen machines have employed clamping cylinders associated with all four tie rods, thereby applying force to the mold via the tie rods. Clamping the mold in this manner tends to be rather complex since it requires that four clamping mechanisms be carefully synchronized to assure that uniform pressure is applied to the mold.

A few prior art attempts have been made to apply the clamping force centrally through a mold mounting surface. However, these clamping systems have not been satisfactory because of their failure to maintain alignment of the mold surfaces. In particular, due to the variation in weights of different molds, combined with the manufacturing tolerances of the components and associated running clearances connected with assembly, the mold mounting surface tilts from vertical after the mold is attached. In other words, the prior art has failed to provide a means of compensating for the manufacturing tolerance stack-up.

SUMMARY OF THE INVENTION

It is an object of the present invention to provide a two-platen clamping system that applies uniform clamping force to the mold and includes means to ensure vertical alignment of the associated mold mounting surface.

The present invention is generally described as a self-compensating support skate for an annular hydraulic ram mounted in the front stationary platen of a "two-platen" injection molding machine. More specifically, the hydraulic ram fits into a central bore in the stationary platen and connects directly to a relatively thin mold mounting (die) platen. The purpose of the skate is to prevent movement (tilting) of the mold mounting platen and the resulting misalignment of the platens when the mold is attached. Without the skate, movement of the die platen would occur due to the variation in weights of different molds combined with the manufacturing tolerances of the components and associated running clearances in the normal ram assembly.

The skate is positioned at the bottom of the ram on the injection side of the stationary platen, where it is adjusted during assembly to compensate for the tolerance stack-up. In particular, after the tie rods are leveled, the skate is adjusted so that the upper surface of the ram is in contact with a mating bronze sleeve in the stationary platen; a lock nut holds the skate in this position. The die platen is then raised until its mold mounting face is parallel with the movable platen. Appropriately sized shims are installed to establish the desired spacing between the die platen and lower tie rods thereby maintaining parallelism.

Adjustment and support of the hydraulic ram in this manner effectively reduces the tolerance stack-up to zero and virtually eliminates movement (tilting) of the die platen due to the weight of the attached mold half. This "zero" clearance is maintained by disc springs within the skate that compensate for the expansions and contractions of the large diameter parts due to temperature variations. The disc springs also prevent massive overloading of the support skate when an "out-of-parallel mold" is used.

BRIEF DESCRIPTION OF THE DRAWINGS

FIG. 7 is an enlarged, fragmentary, sectional view of the ram skate assembly, as shown in the sectional view of the stationary platen assembly in FIG. 6.

FIG. 8 is an enlarged, fragmentary view showing the manner in which the die platen of the stationary platen assembly shown in FIG. 5 is supported by the tie rods.

DESCRIPTION OF THE PREFERRED EMBODIMENT

Figure 1:
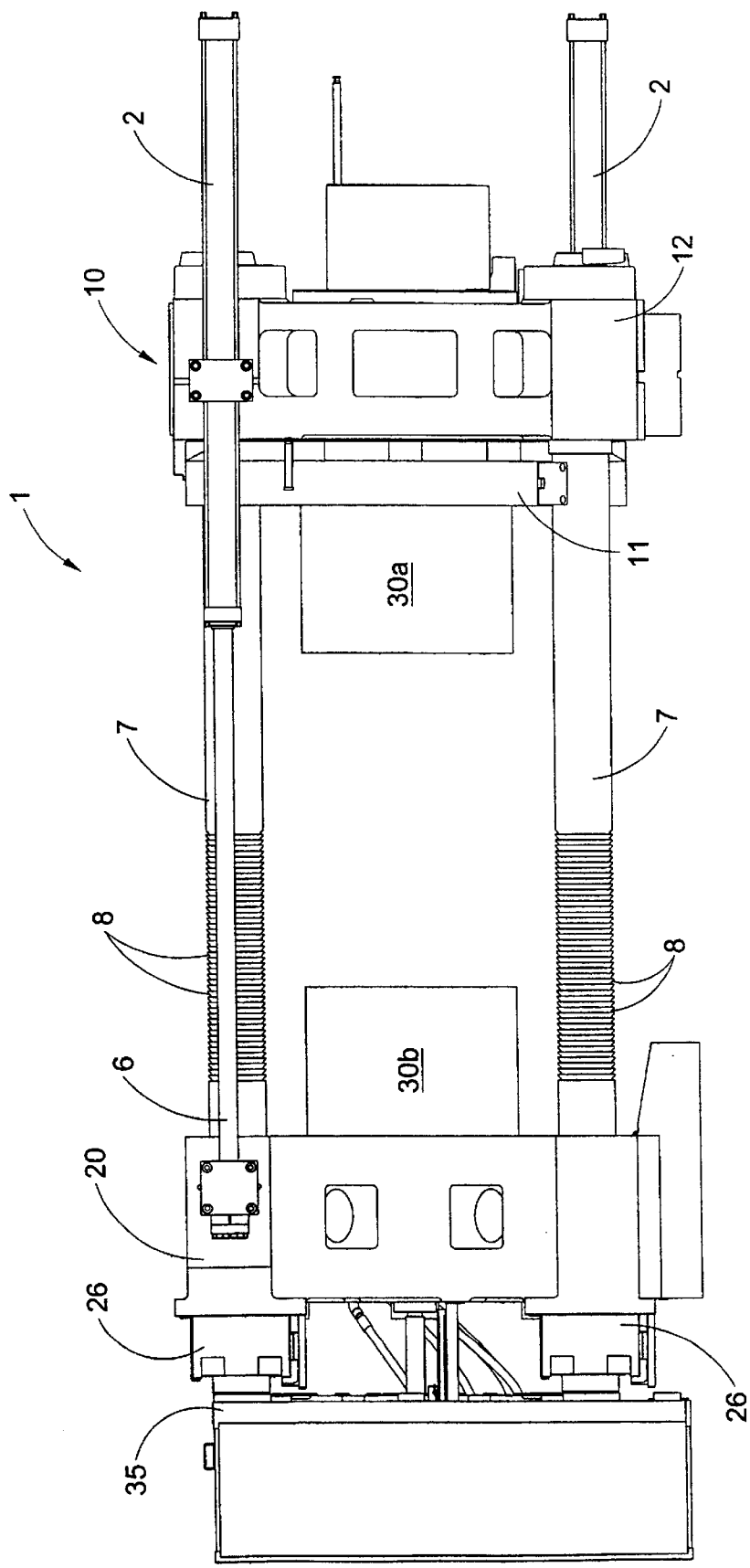
FIG. 1 is a side view of the clamping system for a two-platen injection molding machine incorporating the ram support skate of the present invention.
Figure 2:
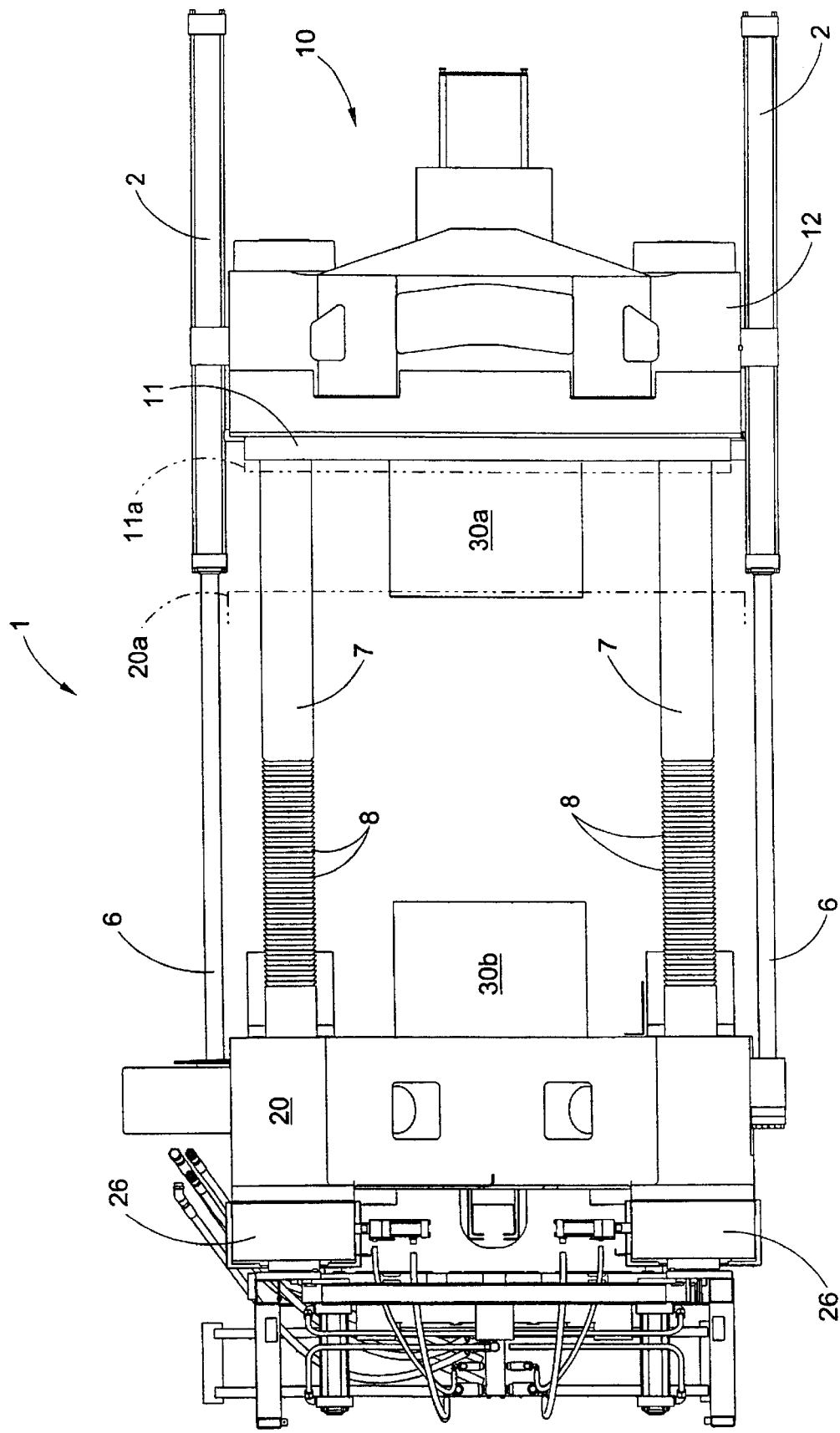
FIG. 2 is a top view of the clamping system for a two-platen injection molding machine incorporating the ram support skate of the present invention.

As illustrated in FIGS. 1 and 2, the clamping system 1 associated with the present invention generally includes a stationary platen assembly 10 (including a die platen 11 and a cylinder platen 12), a movable platen 20, tie rods 7, traverse cylinders 2, a stationary mold half 30a, a movable mold half 30b, a rear support plate 35 and tie rod locking mechanisms 26.

Specifically, the stationary mold half 30a is mounted to the die platen 11 of the stationary platen assembly 10 which is, in turn, fixed to a suitable machine base (not shown). The movable mold half 30b is mounted to the movable platen 20 which is, in turn, located at the other end of the machine base. The traverse cylinders 2 are fixedly mounted to the stationary platen 10 at the diagonally opposed positions shown. The piston rod 6 of each traverse cylinder 2 is connected to the movable platen 20, so that simultaneous operation of the cylinders 2 causes the movable platen 20 to move linearly on the machine base with respect to the stationary platen 10. FIGS. 1 and 2 show the movable platen 20 in the extreme open position; the extreme closed position is indicated by the phantom line 20a shown in FIG. 2.

Four tie rods 7 are fixedly connected by conventional means to the cylinder platen 12, extend through die platen 11 and the movable platen 20, and are stabilized at the opposite end by rear support plate 35. All of the tie rods 7 have a series of circumferential grooves 8 along an intermediate section of each rod 7. When the movable mold half 30b is brought into contact with the stationary mold half 30a, the grooves 8 come into engagement with locking mechanisms 26 mounted on the movable platen 20, locking the movable platen 20 on the tie rods 7. The locking mechanisms 26 are constructed as generally known in the art, including a split collar having a series of rings configured to mate with the grooves 8, and an actuator to move the collar portions into and out of engagement with the tie rods 7. With the locking mechanisms 26 engaged, the distance between the movable platen 20 and cylinder platen 12 is fixed.

Figure 3:
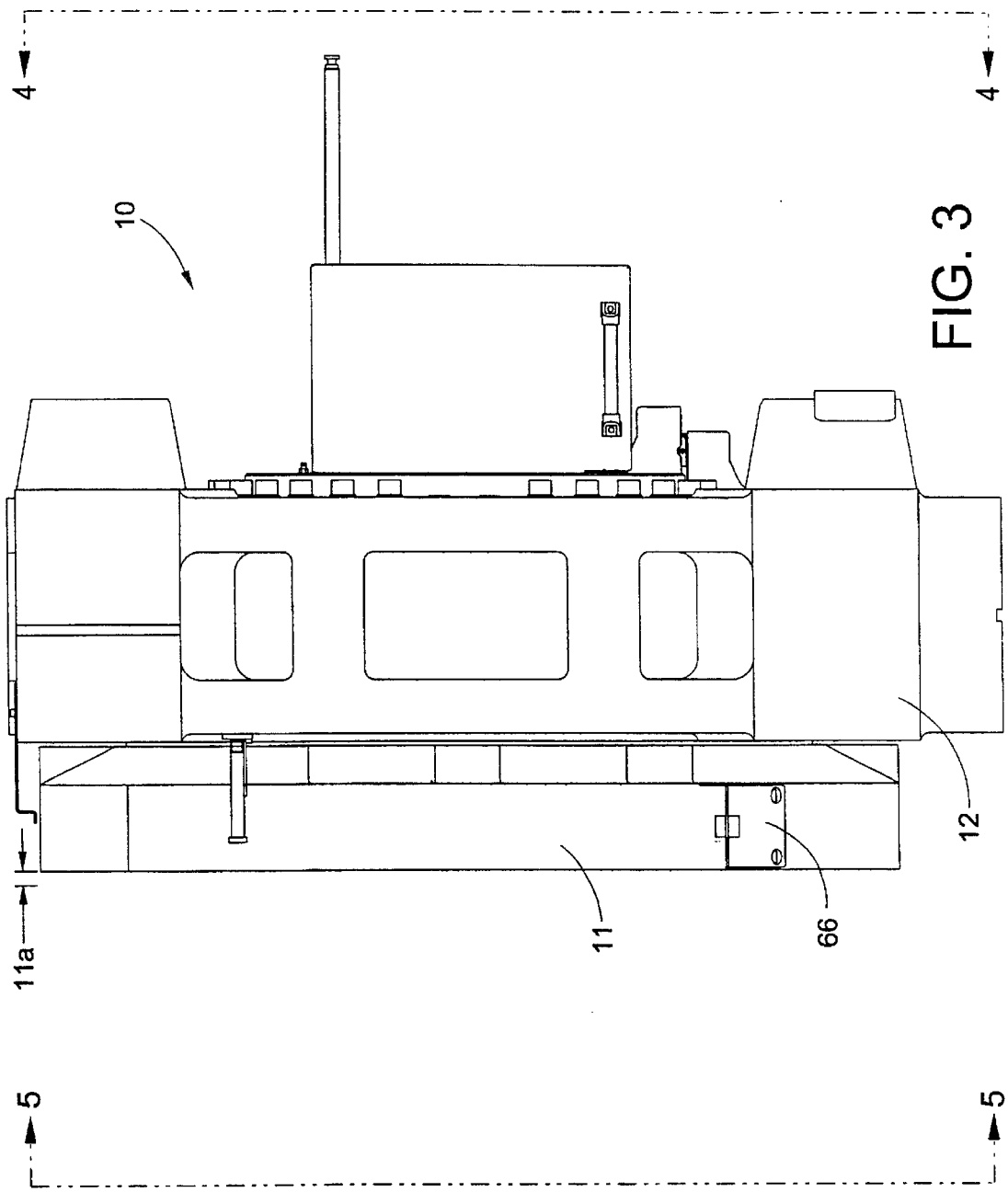
FIG. 3 is an enlarged view of the stationary platen assembly of the clamping system shown in FIG. 1.
Figure 6:
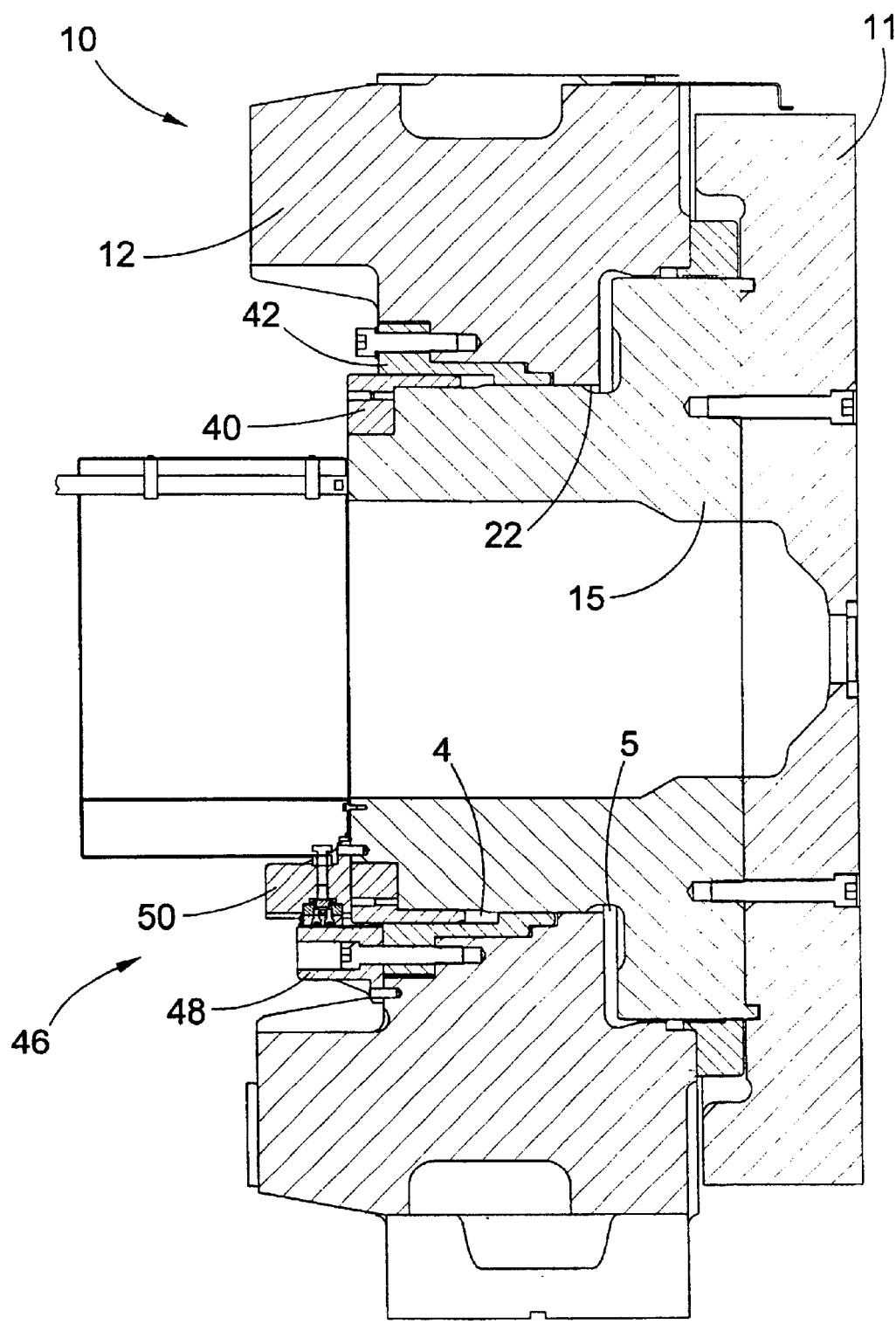
FIG. 6 is a sectional view of the stationary platen assembly, taken along the line 6—6 in FIG. 5.

The primary force for the clamping system 1 is provided by an annular hydraulic cylinder in the stationary platen assembly 10. Referring to FIGS. 6 and 7 in particular, the cylinder platen 12 is provided with a bore 22 configured to receive a ram 15. The ram 15 is of an annular configuration to allow the barrel of an injection unit (not shown) to pass therethrough and communicate with the stationary mold half 30a. The ram 15 also has a flat front face 24 that serves as a means for attachment of the die platen 11, and an elongated section 28 that extends into the central bore 22 of the cylinder platen 12. With this construction, the stroke of the ram 15 is short. The maximum distance of travel for the ram 15 and die platen 11 is approximately equal to the spacing of the grooves 8 on the tie rods 7. The drawings all show the stationary platen assembly 10 with the ram 15 and die platen 11 fully retracted. The phantom line 11a in FIGS. 2 and 3 shows the extent of travel of the die platen 11.

A number of components are fitted between the bore 22 of cylinder platen 12 and the ram 15 to support and guide the ram, as well as providing a sealing means to contain the hydraulic fluid that is used to actuate the ram 15. As best seen in FIG. 7, these components include cylinder ring 40 that attaches to the end of the elongated section 28 of ram 15. Surrounding the cylinder ring 40 and the adjacent portion of the elongated section 28 of ram 15 is a bronze sleeve 42 fitted into the bore 22 of cylinder platen 12. Additional sealing elements, as known in the art, are fitted around the cylinder ring 40 and bronze sleeve 42, as required to contain the hydraulic fluid.

Figure 4:
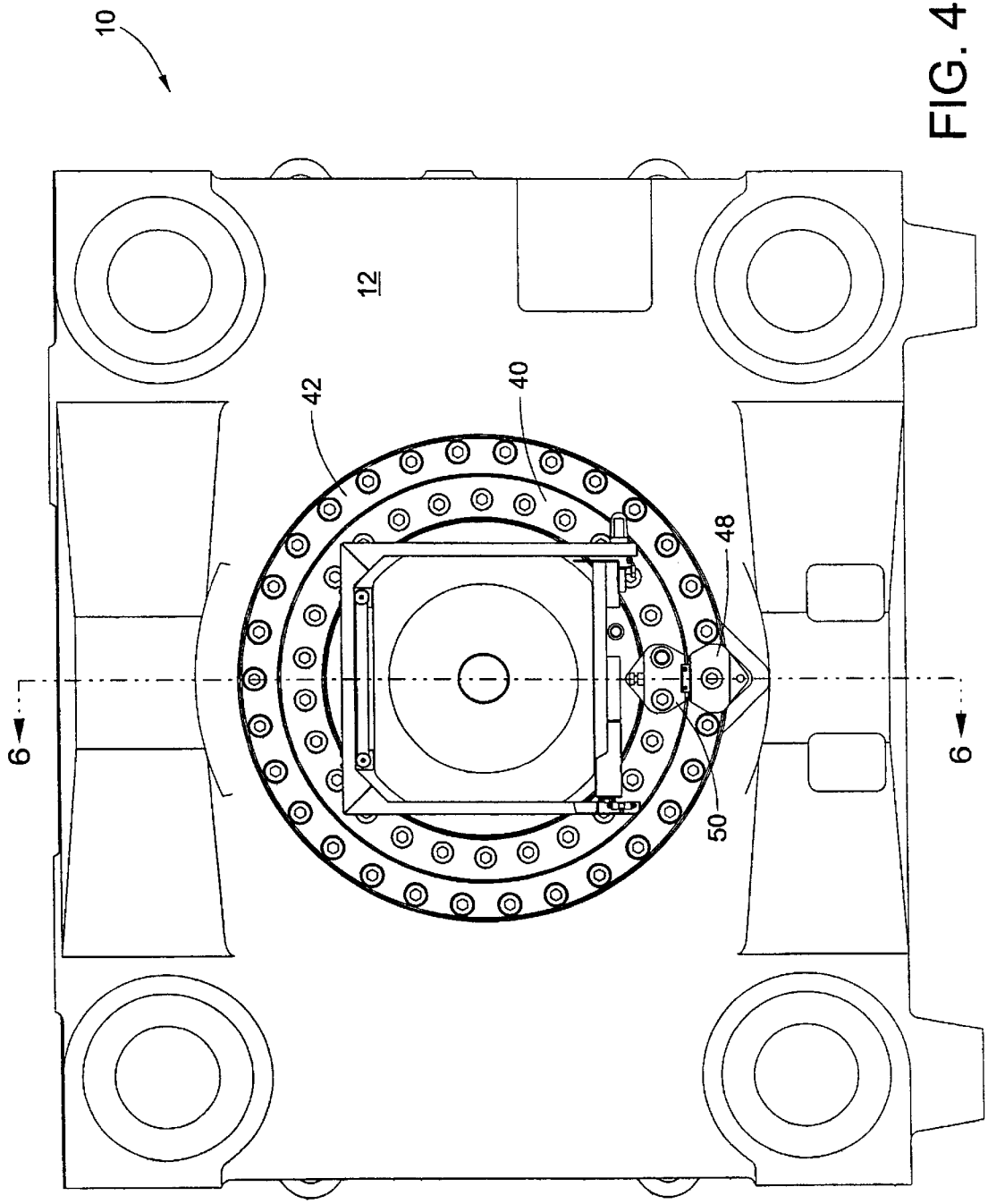
FIG. 4 is a view showing the back side of the stationary platen assembly, taken along the line 4—4 in FIG. 3.
Figure 5:
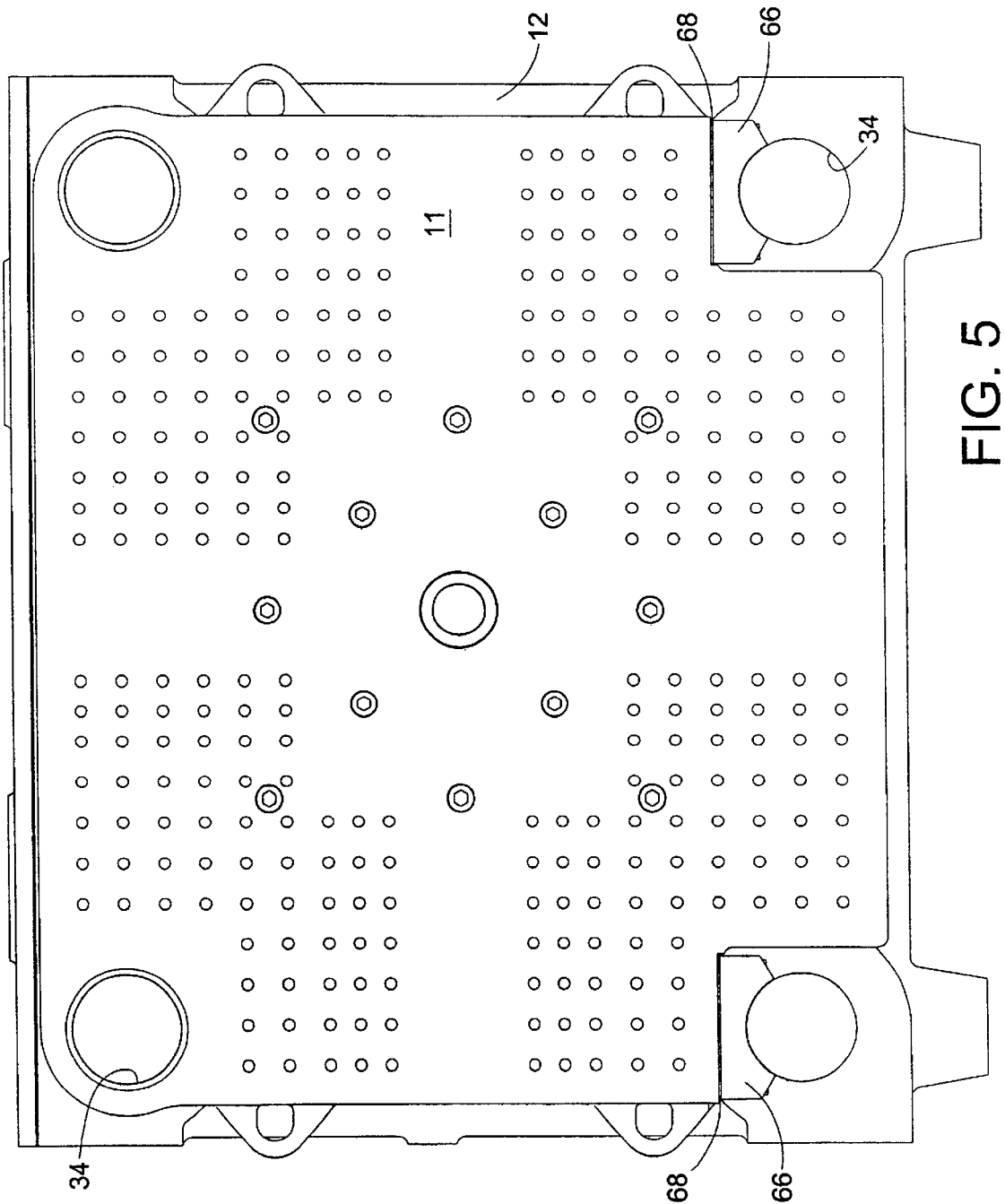
FIG. 5 is a view showing the mold mounting side of the stationary platen assembly, taken along the line 5—5 in FIG. 3.

Although the components associated with the ram 15 and cylinder platen 12 as described above are effective to construct a functional hydraulic cylinder, the fact that this assembly includes several close-fitting, manufactured components results in a "stack-up" of manufacturing tolerances assigned to each of the individual components. In addition, further variation is introduced by the associated running clearances necessary for normal operation of the ram assembly. Accordingly, a ram skate assembly 46 is positioned at the bottom of the ram 15 on the injection side of the stationary platen assembly, as shown in FIGS. 4 and 6. In this position, the ram skate 46 enables adjustment of the ram 15 relative to the cylinder platen 12, during the assembly process to compensate for the tolerance stack-up.

As best seen in FIG. 7, the ram skate assembly 46 preferably includes a lower bearing support 48 attached by a bolt that passes through the flange of the bronze sleeve 42 and into the cylinder platen 12. An upper bearing support 50 is similarly attached to the end on the ram 15 by bolts that pass through the cylinder ring 40. The remaining elements of the ram skate assembly 46 include an adjustment screw 52, a load pin 54, spring washers 56, skate washer 58, wear pad 60 and skate plate 62.

The assembly process requires that the tie rods 7 be positioned in the stationary platen assembly 10, fixedly connected to the cylinder platen 12 and leveled. The ram skate 46 is adjusted by rotating the adjustment screw 52 so that it acts through the load pin 54, spring washers 56, skate washer 58, wear pad 60 and skate plate 62 on lower bearing support 48, moving the upper surface of the ram 15 into contact with the mating bronze sleeve 42 in the cylinder platen 12. After the ram 15 is adjusted into the desired position, reducing the tolerance stack-up to "zero", a lock nut 64 is used to hold the adjustment screw 52 in place and maintain the zero tolerance.

With one portion of the ram 15 thus properly positioned, the assembly process continues by raising die platen 11 (and the forward end of ram 15), using floor jacks, for example, until the mold mounting face of the die platen 11 is parallel with the four tie rod collar mounting surfaces of the cylinder platen 12. (By construction the faces of the rod collars are perpendicular to the tie rods and thus parallel to the mold mounting surface of the movable platen 20). Raising the die platen 11 results in a gap between the bronze shoe 66 that rides on the lower tie rod and the bottom surface of the die platen 11, see FIG. 8. This gap is measured so that an appropriately sized shim 68 can be made and installed to fill the gap, thus ensuring that the mold mounting face of the die platen 11 remains aligned with the corresponding surface of the movable platen.

Adjustment and support of the ram 15 in this manner effectively reduces the tolerance stack-up to zero and virtually eliminates movement (tilting) of the die platen 11 due to the weight of the attached mold half 30b. The desired "zero" clearance is maintained by the spring washers 56 within the skate assembly 46 that compensate for the expansions and contractions of the large diameter parts that occur due to temperature variations. It should also be appreciated that the spring washers 56 will also prevent overloading of the ram skate 46 when an "out-of-parallel" mold is run in the clamping system 1. As described above, the machine is assembled so that the mold mounting surfaces of die platen 11 and moving platen 20 are parallel. If the mounting surfaces of the mold are not parallel when the mold is closed, the clamping tonnage will tend to force the platens to align with the mold, the spring washers 56 will absorb some of the platen displacement in this situation.

Operation of the clamping system 1 will now be described. Prior to production operation of the machine it is necessary to establish (set-up) certain operating parameters associated with the size of the mold. More specifically, after the mold halves 30a, 30b are attached to the mounting surfaces of the die platen 11 and movable platen 20 respectively, the operator uses the machine control to initiate an automatic die height set-up process. As a first step, the ram 15 (along with the stationary mold half 30a on die platen 11) is fully retracted (i.e., zero stroke forward) with respect to the cylinder platen 12. The traversing cylinders 2 will then operate to position the movable platen 20 so that the mold is closed. The machine uses feedback of this movable platen position to determine whether the locking mechanisms 26 are aligned with the grooves on the tie rods. If they are not aligned, the control will calculate the distance to a new position for the movable platen where the locking mechanisms will properly align with the grooves on the tie rods. This distance will determine the required stroke of the ram 15 to pre-position the movable mold half properly with respect to production operation.

To begin a cycle of machine operation, the traversing cylinders 2 are operated to bring the mold halves together, so that the movable platen 20 together with the locking mechanisms 26 move along the tie rods 7 toward the stationary platen assembly 10. The grooves 8 formed on the tie rods 7 pass through holes 34 of the movable platen 20 as it traverses along the machine base. The movable platen 20 continues toward the stationary platen 10 so that the movable mold half 30b is slowly brought into close proximity with the stationary mold half 30a. When the movable platen 20 reaches a predetermined position (as determined by the mold set-up procedure), the locking mechanisms 26 are actuated to engage with the grooves 8 of the tie rods 7.

After the locking mechanisms 26 have fully engaged the grooves 8, hydraulic oil is supplied to a chamber 5 adjacent the ram 15 and cylinder platen 12 to close the mold fully and initiate a clamping force by the ram 15 on the die platen 11 and the two mold halves 30a, 30b. With the desired force thus applied to hold the mold closed, plastic melt is injected into the mold cavity.

The retraction of the clamp system is essentially the reverse of the procedure described above. Hydraulic pressure is applied to another chamber 4 adjacent the ram 15 so that clamp pressure is removed from the die platen 11 and stationary mold half 30a, with the ram 15 retracting slightly. After the clamping pressure on the mold is released, the pressure on the locking mechanisms 26 is also released and they are actuated to disengage from the grooves 8. The traversing cylinders 2 are then operated to move the movable platen 20 and movable mold half 30b away from the stationary mold half 30a a sufficient distance to allow removal of the molded part.

While the invention has been illustrated in some detail according to the preferred embodiment shown in the accompanying drawings, and while the preferred embodiment has been described in some detail, there is no intention to thus limit the invention to such detail. On the contrary, it is intended to cover all modifications, alterations, and equivalents falling within the spirit and scope of the appended claims. For example, although the ram, die platen and tie rods are shown and described as part of the stationary platen assembly, it is conceivable to connect some or all of these elements to the movable platen.

What is claimed is:

1. An injection molding machine comprising a movable platen (20) having a first mold mounting surface, a stationary platen (12) with a cylindrical bore (22), a ram (15) received within the cylindrical bore (22), and a die platen (11) having a second mold mounting surface, wherein the die platen (11) is attached to the ram (15) and positioned between the stationary and movable platen so that pressure applied to the ram (15) will serve to provide clamping force to a mold mounted between the first and second mold mounting surfaces, the molding machine further comprising adjustable support means (46) for stabilizing the position of the ram (15) relative to the cylindrical bore (22) and aligning the second mold mounting surface to the first mold mounting surface.

2. Apparatus for compensating for manufacturing tolerances between a hydraulic cylinder (22) and a hydraulic ram (15) that is slidably received within the cylinder (22), said apparatus comprising:

(a) a lower bearing support (48) carried by the hydraulic cylinder (22) at a lower surface at one end of the cylinder (22);

(b) an upper bearing support (50) carried by the hydraulic ram (15) at a lower surface at one end of the ram (15); and (c) an adjusting member carried by one of the upper bearing support (50) and the lower bearing support (48) and in contacting engagement with the other of the upper bearing support (50) and the lower bearing support (48) for applying pressure against the other bearing support to urge an upper surface of the ram (15) into contacting engagement with an upper surface of the cylinder (22) to minimize tilting movement between the ram (15) and the cylinder (22) caused by manufacturing tolerances and thermal effects on each of the ram (15) and the cylinder (22).

3. Apparatus in accordance with claim 2 wherein the upper and lower bearing supports (50,48) are positioned adjacent each other and have respective surfaces that are in facing relationship with each other.

4. Apparatus in accordance with claim 2 wherein the adjusting member is carried by the upper bearing support (50).

5. Apparatus in accordance with claim 2 wherein the adjusting member includes:

(a) an adjustment screw (52) carried by one of the upper bearing support (50) and the lower bearing support (48);

(b) a wear pad (60) positioned at an end of the adjustment screw (52) and in sliding engagement with a bearing surface (62) carried by the other of the upper bearing support (50) and the lower bearing support (48); and (c) a spring (56) positioned between the adjusting screw (52) and the wear pad (60) for maintaining contact pressure on the wear pad (60) against the bearing surface (62).

6. Apparatus in accordance with claim 5 wherein the adjusting member is carried by the upper bearing support (50).

7. Apparatus in accordance with claim 5 wherein the bearing surface is a removable plate member (62).

8. Apparatus in accordance with claim 5 wherein the spring includes a plurality of spring washers (56).

9. A stationary platen assembly (10) for an injection molding machine mold clamping system, said stationary platen assembly (10) comprising:
   (a) a platen body (12) including a first mold supporting surface for supporting one part of a multi-part injection mold;
   (b) a clamping force cylinder (22) formed in the platen body (12), and a ram (15) slidably carried in the clamping force cylinder (22) for engagement with a die platen (11) carried by the platen body, wherein the clamping force cylinder (22) is adapted to apply a clamping force to the multi-part mold; and
   (c) an adjusting member (46) for maintaining the first mold supporting surface in a desired parallel orientation relative to a second mold supporting surface spaced from the first mold supporting surface and independent of manufacturing tolerances and thermal expansion of the clamping force cylinder (22) and ram (15), wherein the adjusting member (46) is carried by the stationary platen and is positioned at an end of the stationary platen that is opposite from and spaced from the first mold supporting surface, wherein the adjusting member (46) is positioned to provide an upward force on an outer end of the ram (15) and thereby maintain contact between an upper portion of the clamping force cylinder (22) and an upper portion of the ram (15).

10. A stationary platen assembly (10) in accordance with claim 9 wherein the adjusting member is carried by one of an upper bearing support (50) and a lower bearing support (48) and is in contacting engagement with the other of the upper bearing support (50) and the lower bearing support (48) for applying pressure against the other bearing support to urge an upper surface of the ram (15) into contacting engagement with an upper surface of the cylinder (22) to minimize tilting movement between the ram (15) and the cylinder (22) caused by manufacturing tolerances and thermal effects on each of the ram (15) and the cylinder (22).

11. A stationary platen assembly (10) in accordance with claim 10 wherein the adjusting member includes:
   (a) an adjustment screw (52) carried by one of the upper bearing support (50) and the lower bearing support (48);
   (b) a wear pad (60) positioned at an end of the adjustment screw (52) and in sliding engagement with a bearing surface (62) carried by the other of the upper bearing support (50) and the lower bearing support (48); and
   (c) a spring (56) positioned between the adjustment screw (52) and the wear pad (60) for maintaining contact pressure on the wear pad (60) against the bearing surface (62).

12. A stationary platen assembly (10) in accordance with claim 11 wherein the adjusting member is carried by the upper bearing support (50).

13. A stationary platen assembly (10) in accordance with claim 11 wherein the bearing surface is a removable plate member (62).

14. A stationary platen assembly (10) in accordance with claim 11 wherein the spring includes a plurality of spring washers (56).

15. A mold clamping system for an injection molding machine, said mold clamping system comprising:
   (a) a stationary platen (10) having a first mold supporting surface for supporting a first mold part of a multi-part mold, and including a clamping force cylinder (22) and a ram (15) slidably carried in the cylinder (22) for applying a clamping force to the multi-part mold;
   (b) a movable platen (20) having a second mold supporting surface for supporting a second part of a multi-part injection mold, wherein the first and second mold parts are adapted to be brought into and out of contacting engagement with each other by movement of the movable platen (20) relative to the stationary platen (10);
   (c) a plurality of parallel tie rods (7) extending between the stationary platen and the movable platen (20) for guiding movement of the movable platen (20) toward and away from the stationary platen (10) and for maintaining the first and second mold supporting surfaces in parallel relationship during movement of the movable platen (20); and
   (d) an adjusting member (46) for maintaining the first mold supporting surface in a desired parallel orientation relative to the second mold supporting surface independent of manufacturing tolerances and thermal expansion of parts of the clamping system, wherein the adjusting member (46) is carried by the stationary platen and is positioned at an end of the stationary platen that is opposite from and spaced from the first mold supporting surface, and wherein the adjusting member (46) is positioned to provide an upward force on an outer end of the ram (15) to compensate for size variations between interfitting parts of the clamping force cylinder (22) and the ram (15).

16. A mold clamping system in accordance with claim 15, wherein the adjusting member is carried in a recessed area formed in the stationary platen (10) and faces in a direction opposite from that of the first mold supporting surface.

17. A mold clamping system in accordance with claim 15, wherein the adjusting member is positioned adjacent a lowermost portion of the ram (15).

18. A mold clamping system in accordance with claim 15, wherein the adjusting member includes a spring (56) for providing a force to urge opposed surfaces of the clamping force cylinder (22) and the ram (15) into contacting engagement.

19. In an injection molding machine comprising a movable platen (20) having a first mold mounting surface, a stationary platen (12) with a cylindrical bore (22), a ram (15) received within the cylindrical bore (22), a die platen (11) having a second mold mounting surface and a plurality of parallel tie rods (7) connected to the stationary platen (21) and passing through the other platens, wherein the die platen (11) is attached to the ram (15) and positioned between the stationary and movable platens so that it is at least partially supported by the tie rods (7), a method for aligning the second mold mounting surface to the first mold mounting surface comprising the steps of:
   (a) adjusting the position of the ram (15) so that the upper surface of the ram (15) is in contact with the adjacent surface of the bore (22) in the stationary platen (12),
   (b) adjusting the position of the die platen (11) until the second mold mounting surface is parallel with the first mold mounting surface which results in a defined space between a lower surface of the die platen (11) and the tie rods (7), and
   (c) maintaining the alignment of the second mold mounting surface relative to the first mold mounting surface by means of a sliding shoe (66) that is sized to fill the space between the lower surface of the die platen (11) and the tie rods (7).

20. A method for compensating for manufacturing tolerances between a hydraulic ram (15) and a hydraulic cylinder (22) within which the ram (15) is slidably carried, said method comprising the steps of:

(a) applying a first upward force at a first end of each of the ram (15) and the cylinder (22) to provide contacting engagement between upper surfaces of the ram (15) and the cylinder (22) at the first ends thereof;

(b) attaching a first mold plate (11) to a second end of the ram (15) spaced from the first end thereof;

(c) applying a second upward force at the first mold plate (11) to bring the first mold plate into alignment with a second mold plate (20) movable relative to the first mold plate; and (d) inserting at least one shim (68) below the first mold plate after the alignment with the second mold plate has been established.

21. A method in accordance with claim 20 including the step of maintaining the first upward force during operation of the ram (15).

22. A method in accordance with claim 20 wherein the step of applying the first upward force includes adjusting the force to compensate for thermal expansion and contraction of the ram (15) and cylinder (22) during operation.

* * * * *